(12) United States Patent
Kuenzner

(10) Patent No.: US 7,237,203 B1
(45) Date of Patent: Jun. 26, 2007

(54) PROCESS AND DEVICE FOR VISUAL DISPLAY OF INFORMATION IN MOTOR VEHICLES

(75) Inventor: Hermann Kuenzner, Freising (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 286 days.

(21) Appl. No.: 09/715,069

(22) Filed: Nov. 20, 2000

(30) Foreign Application Priority Data

Dec. 10, 1999 (DE) ................................ 199 59 597

(51) Int. Cl.
*G06F 3/00* (2006.01)
(52) U.S. Cl. ................... 715/764; 715/700; 701/123
(58) Field of Classification Search ................ 345/764, 345/864, 866, 790, 791, 794; 73/113, 114
See application file for complete search history.

(56) References Cited

U.S. PATENT DOCUMENTS

| | | | | |
|---|---|---|---|---|
| 4,180,860 A | * | 12/1979 | Driscoll et al. | 700/10 |
| 4,551,803 A | * | 11/1985 | Hosaka et al. | 701/105 |
| 4,570,226 A | * | 2/1986 | Aussedat | 701/123 |
| 4,843,575 A | * | 6/1989 | Crane | 701/99 |
| 4,918,619 A | * | 4/1990 | Orloff et al. | 702/52 |
| 5,693,876 A | * | 12/1997 | Ghitea, Jr. et al. | 73/114 |
| 6,092,021 A | * | 7/2000 | Ehlbeck et al. | 701/123 |
| 6,244,540 B1 | * | 6/2001 | Stabile et al. | 224/118.5 |
| 6,289,332 B2 | * | 9/2001 | Menig et al. | 707/1 |
| 6,447,337 B1 | * | 9/2002 | Anderson et al. | 439/620 |
| 6,453,731 B1 | * | 9/2002 | Yaegashi | 73/113 |
| 6,476,725 B2 | * | 11/2002 | Aguren | 340/815.4 |
| 6,587,759 B2 | * | 7/2003 | Obradovich et al. | 701/1 |

FOREIGN PATENT DOCUMENTS

| | | |
|---|---|---|
| DE | 3346370 | 11/1985 |
| DE | 39 36 373 | 5/1991 |
| DE | 9106762 | 10/1991 |
| DE | 19539799 | 9/1996 |
| EP | 0091887 A1 * | 3/1983 |
| EP | 0846588 | 10/1998 |

* cited by examiner

*Primary Examiner*—Kieu D. Vu
(74) *Attorney, Agent, or Firm*—Crowell & Moring LLP

(57) ABSTRACT

In a process and device for visual display of information in motor vehicles with an electronically controllable display, the display is controlled in such a manner that at least two sets of information, having an interrelated effect, are displayed as a comparison by graphical representation. Examples of information having an interrelated effect are the value pairs—range/distance, current fuel consumption/average fuel consumption, tank content/range, total travel time/time traveled. In this respect the information is displayed at the same place alternating with the same type of graphics, but with different labels.

8 Claims, 1 Drawing Sheet

PROCESS AND DEVICE FOR VISUAL DISPLAY OF INFORMATION IN MOTOR VEHICLES

The invention relates to a process and a device for visual display of information in motor vehicles in accordance with the preamble of patent claims 1 and/or 4.

Such a process and such a device are known, for example, from the DE 39 36 373 A1. In this case, the information pairs—fuel supply and current usage or fuel supply and range—are placed opposite each other simultaneously in a single display in the sense of generating a difference. Of course, the result of this simultaneous, comparison display of at least two sets of information having an interrelated effect is a synergetic effect, which allows the driver to conclude from the mere listing of information additional information, but it is possible for too much information to appear in too little space.

Furthermore, past instrument combinations (also so-called instrument clusters or indicating panels) in the area of the dashboard in motor vehicles simultaneously indicate information, such as revolutions, speed, consumption, tank content, range, etc., either with a pointer or a display. If a display is used, diverse information of the car computer can be displayed in sequence, especially in connection with a car computer, by actuating an operating element, such as a pressure switch. In so doing, the information is displayed one at a time, only upon manual query, according to a defined order of sequence without any contextual order, usually in text.

The object of the invention is to improve a process and a device of the aforementioned class with respect to ergonomic requirements. In particular, the driver is supposed to be as well informed as possible about his car, on the one hand, but not overstrained by too much information in too little space, on the other hand.

The process and/or the device exhibiting the features disclosed in patent claims 1 and 4 respectively solve this problem.

Other improvements of the invention are the objects of the dependent patent claims.

With the inventive process and the inventive indicator, which contains an electronic controller and a display, which is controlled electronically by the controller, the display is controlled in such a manner automatically or manually by the controller that at least two sets of information, having an interrelated effect, are displayed as a comparison by graphical representation. In this respect the information is displayed at the same place alternating with the same graphics, i.e. with the same type of representation, but with a different label. The graphics appears at the same place in the display. The change takes place, for example, in defined time segments or by actuating a control switch per user request.

Examples of information having an interrelated effect are the value pairs—range/distance, current fuel consumption/average fuel consumption, tank content/range, total travel time/time traveled.

In addition, other information can be simultaneously displayed (e.g. below or inside the graphical representation of the alternatingly displayed information).

Preferably the information is displayed with a bar graph.

The diverse information can be displayed in different colors or intensity of illumination (light/dark).

Owing to the comparison display of two or more sets of information having interrelated effect, the driver can see very quickly at first glance additional information, such as "tank content is adequate for the total travel time" or "in this driving style the average fuel consumption will increase". Thus, the driver's concentration is diverted as little as possible from the driving. The alternating display of the information gives a better overview of the display. Since the information exhibits an interrelated effect, the driver can easily follow the alternatingly displayed information and grasp its meaning.

The drawings depict embodiments of the invention.

In addition, reference is made to the fact that the comparison display of information is not limited to the display of only two sets of information.

Figure 1:
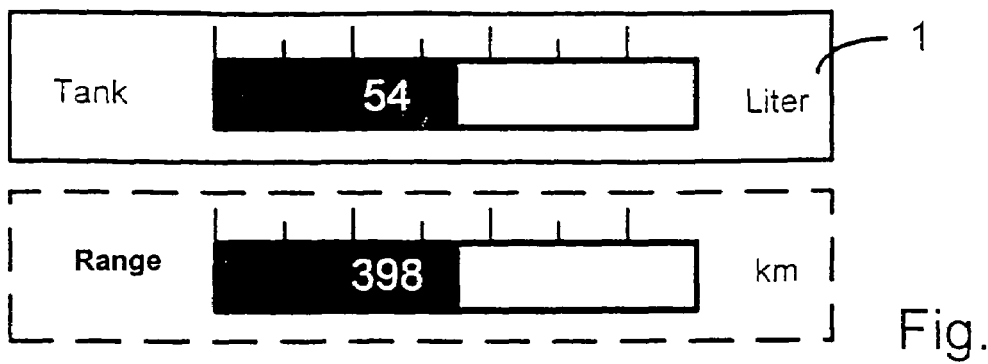
FIG. 1 is an alternating comparison display of information, according to the invention, using as examples the information tank content and range.

In FIG. 1 the information tank content (tank) and range is displayed alternatingly one above the other at the same place of a display 1. An alternating display can be time-controlled, for example, every 5 seconds, or manually, for example, by actuating a control switch according to the user's request. In so doing, a display in the instrument cluster can be enabled with a control switch, which is to be actuated in the axial direction and is located on the pitman drop arm. Thus, actuating the control switch results in a different labeling of the tank content bar (in liters or in kilometers). At the same time the same graphics, namely a dark bar on a light background, is used with a different label of information and its units (liters (l) or km). Such a representation is especially advantageous with a very narrow display. In the illustrated example, the tank content is shown once in the form of a bar with the labeling of the actual tank content in liters and once the range with the labeling of the actual range in km. Since the length of the bar cannot change when the display changes, the display of the tank content is quasi continuous.

Figure 2:
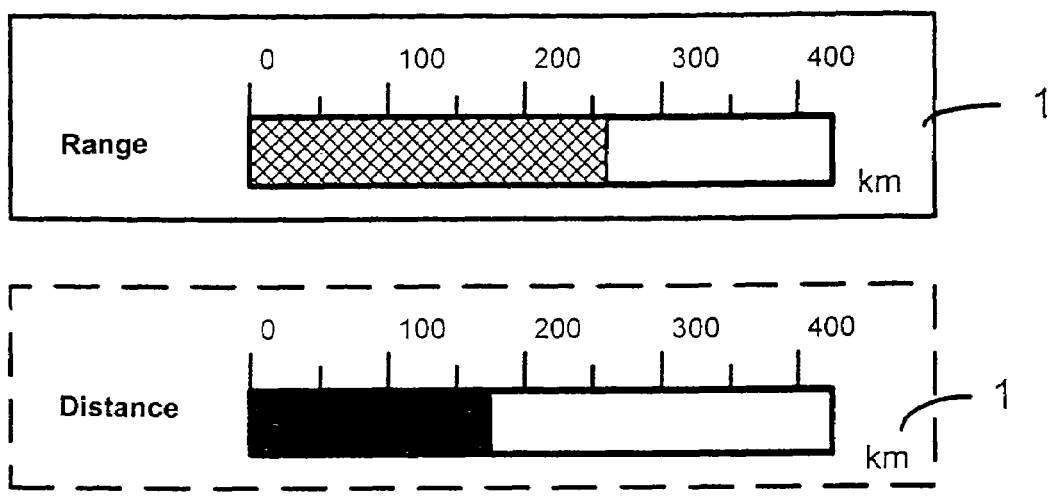
FIG. 2 is an alternating comparison display of information, according to the invention, using as examples the information range and distance.

According to FIG. 2, the two sets of information range and distance, which have an interrelated effect based on fuel consumption, are displayed alternatingly with bar graphs at the same place on a display 1. The range indicates how many kilometers the vehicle can still travel with the current tank content at approximately constant driving style or fuel consumption without refueling. The distance indicates how many kilometers still remain until the entered destination. Prerequisite is, for example, a car computer or a navigation system. In addition, the bar for representing the range is brighter than the bar for representing the distance. Owing to the varying intensity of illumination the distance is especially highlighted as the more important of the two sets of information. In the present case there is enough fuel in the tank to reach the destination, if the driving style and/or the fuel consumption remains approximately the same. The driver understands this additional information by one brief glance at the indicator of the invention without having to make any numerical considerations.

Figure 3:
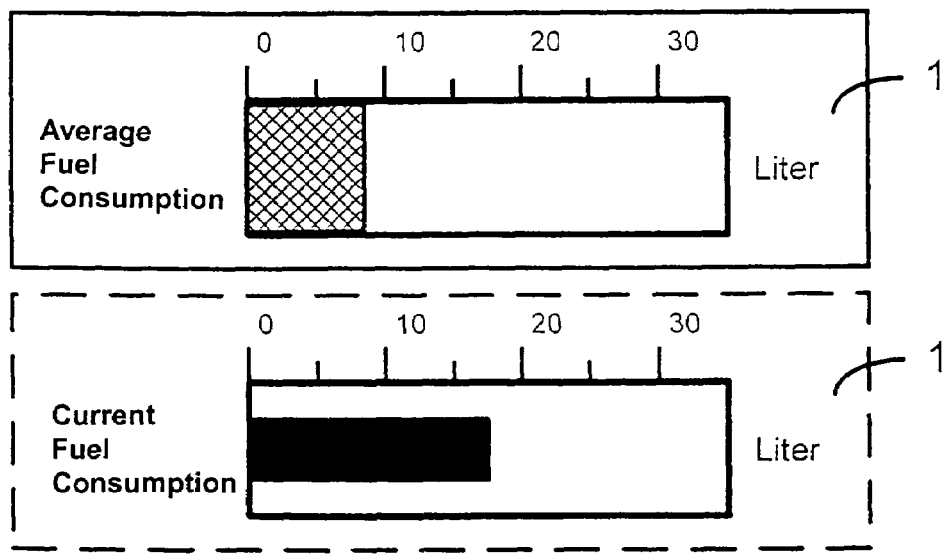
FIG. 3 is an alternating comparison display of information, according to the invention, using as examples the information current fuel consumption and average fuel consumption.

FIG. 3 depicts, according to the invention, another possible representation using the information current fuel consumption and average fuel consumption as an example. The current fuel consumption is indicated by the dark narrow bar; the average fuel consumption, by the lighter wide bar. In so doing, the alternating frequency can be increased so much, as desired, that the eye perceives a simultaneous representation of both sets of information. If at the same place the dark narrow bar emerges, like an arrow, out of the light bar, during fast alternating representation of both sets of information, the result is that the driver sees at a glance the additional information that if he maintains the current driving style the average fuel consumption will increase in the long run and thus the range will decrease.

With a time limit or a reset button the recalculation of the information and/or the values, e.g. at the beginning of the trip, can be started. In this respect a reset of the individual values or a general reset of all relevant values for a trip is conceivable.

What is claimed is:

1. Process for visual display of information with a bar graph performed in a motor vehicle with an electronically controllable display, where the display is controlled in such a manner that at least two sets of information, having an interrelated effect, are displayed at the same place alternating with the same type of graphics, but with different labels, wherein a graphical comparison difference between said at least two sets of information is representative of a third set of information, and wherein said at least two sets of information are selected from the set that includes: a distance range said motor vehicle can travel before exhausting an amount of fuel in said motor vehicle, a distance said motor vehicle has to travel to reach an entered destination, an average fuel consumption of said motor vehicle, a current fuel consumption of said motor vehicle, an amount of fuel in said motor vehicle, and a distance range said motor vehicle can travel before exhausting said amount of fuel, a total travel time and a time traveled.

2. Process as claimed in claim 1, wherein the information is displayed in different colors or intensity of illumination (light/dark).

3. Process as claimed in claim 1, wherein said third set of information relates to whether said amount of fuel is enough to reach the entered destination.

4. Process as claimed in claim 1, wherein said third set of information relates to whether the average fuel consumption is increasing or decreasing.

5. Indicator for visual display of information with a bar graph incorporated into a motor vehicle with an electronically controllable display, comprising means to control the display in such a manner that at least two sets of information, having an interrelated effect, are displayed at the same place alternating with the same type of graphics, but with different labels, wherein a graphical comparison difference between said at least two sets of information is representative of a third set of information, and wherein said at least two sets of information are selected from the set that includes: a distance range said motor vehicle can travel before exhausting an amount of fuel in said motor vehicle, a distance said motor vehicle has to travel to reach an entered destination, an average fuel consumption of said motor vehicle, a current fuel consumption of said motor vehicle, an amount of fuel in said motor vehicle, a distance range said motor vehicle can travel before exhausting said amount of fuel, a total travel time and a time traveled.

6. Indicator as claimed in claim 5, wherein the information is displayed in different colors or intensity of illumination (light/dark).

7. Indicator as claimed in claim 5, wherein said third set of information relates to whether said amount of fuel is enough to reach the entered destination.

8. Indicator as claimed in claim 5, wherein said third set of information relates to whether the average fuel consumption is increasing or decreasing.

* * * * *